Figure 1:
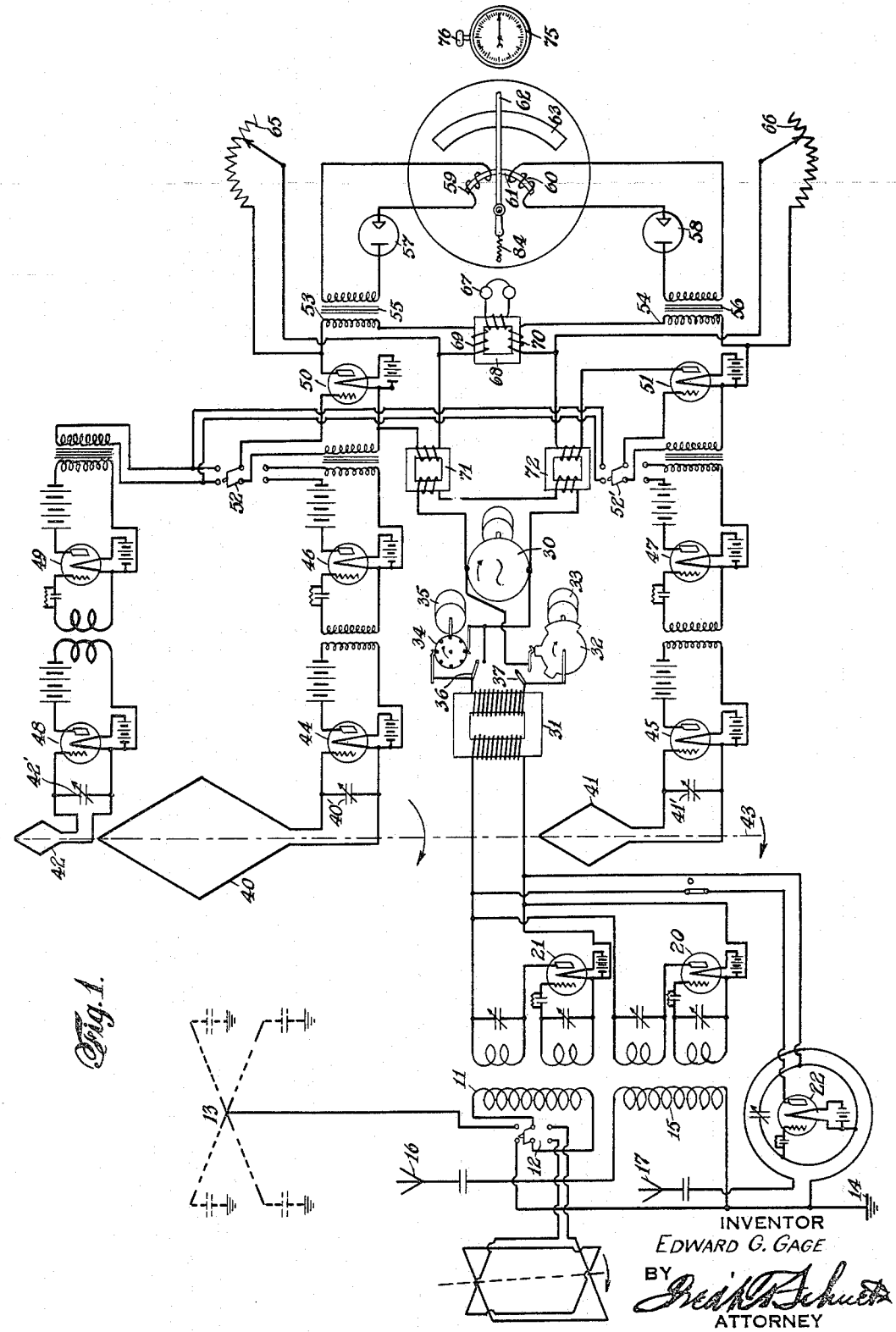

June 5, 1934.  E. G. GAGE  1,961,757
RADIANT ENERGY DISTANCE DETERMINING SYSTEM AND APPARATUS
Filed Sept. 23, 1930   2 Sheets-Sheet 1

INVENTOR
EDWARD G. GAGE
BY
ATTORNEY

June 5, 1934. E. G. GAGE 1,961,757
RADIANT ENERGY DISTANCE DETERMINING SYSTEM AND APPARATUS
Filed Sept. 23, 1930 2 Sheets-Sheet 2

INVENTOR
EDWARD G. GAGE
BY
ATTORNEY

Patented June 5, 1934

1,961,757

UNITED STATES PATENT OFFICE 1,961,757

RADIANT ENERGY DISTANCE DETERMINING SYSTEM AND APPARATUS

Edward G. Gage, Brooklyn, N. Y., assignor of one-half to Electrical Industries Manufacturing Company, New York, N. Y., a corporation of New York, and one-half to Leon Ottinger, New York, N. Y.

Application September 23, 1930, Serial No. 483,802

10 Claims. (Cl. 250—2)

The invention relates to a radio transmission and reception system and to a novel combination of apparatus utilized therein; and more particularly to the determination of the distance between a radio transmitting station and a radio receiving station.

An object of the invention is to enable the determination of the distance between moving objects such as ships, dirigible aircraft, airplanes, submarines and the like from a stationary object such as a lighthouse, mooring mast, landing field and mother ship, as well as the direction thereof in stormy or foggy weather when visual or other signals fail.

Another object of the invention is to determine not only the distance and direction between the aforesaid stations but also from one station whether or not the other station is in motion, as well as whether such moving station is approaching or receding. A still further object of the invention is to determine the rate at which a moving station is approaching or receding.

Another object of the invention resides in the provision of means whereby indication may be had of the presence or absence of an intervening obstacle.

The invention has for a still further object to admit of a station simultaneously transmitting and receiving continuous warning signals, as well as to provide for a system of communication of limited range. Other and ancillary objects of the invention will hereinafter appear.

In carrying out the invention, provision is made for transmitting a plurality of electromagnetic waves, having different attenuation constants and simultaneously modulated by a modulator common thereto, and comparing a resulting received radio signal of high attenuation constant with one of low attenuation constant, the difference between the effects of the two serving as a measure of the distance sought as in being translated or calibrated in miles, kilometres, or other units of distance.

A second comparison between a signal of low attenuation and another of high attenuation, but of widely differing radiation characteristics, serves as a check on the first comparison and, in addition, determines the presence or absence of an intervening obstacle. To determine the rate of progression or recession of a moving station, a time element is introduced as a requisite factor in conjunction with the various comparisons. Furthermore, it is possible to determine whether a transmitter or receiver unit is approaching or receding by ascertaining a change in distance.

Figure 2:
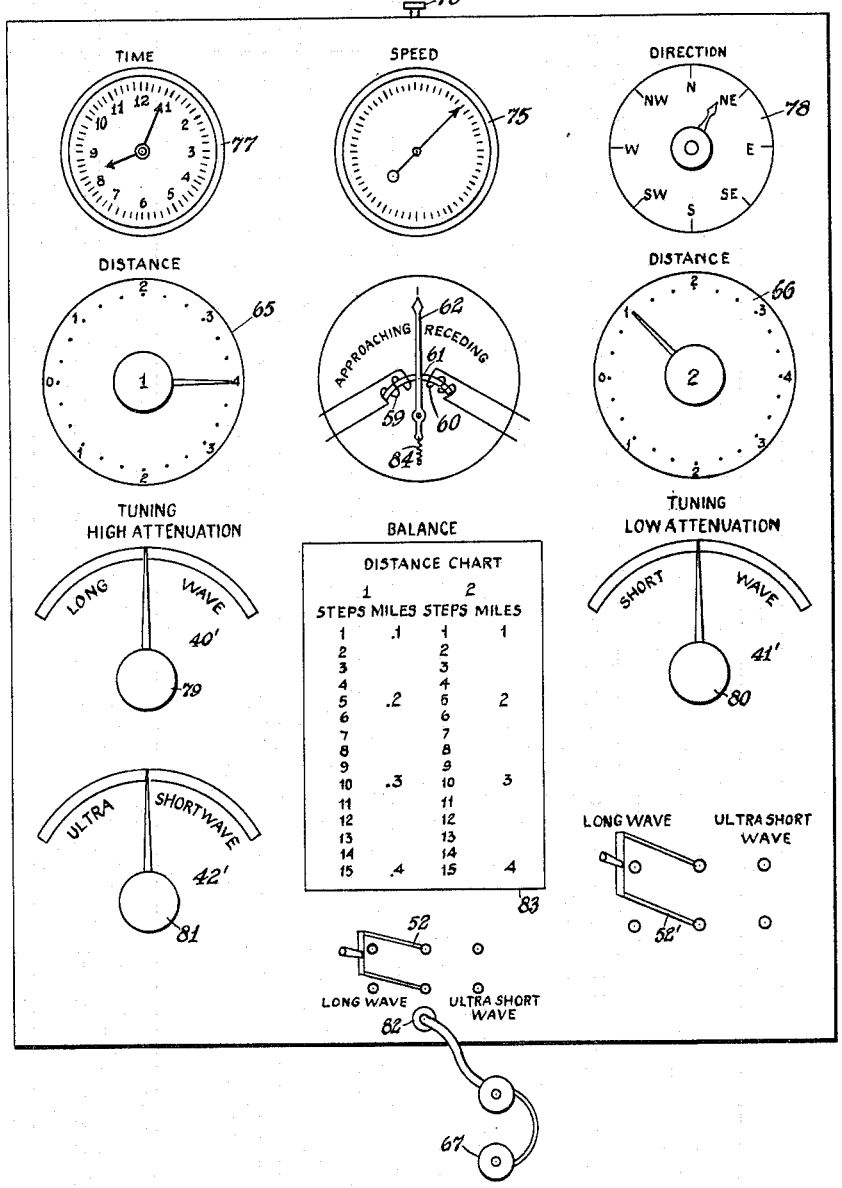

The nature of the invention, however, will best be understood when described in connection with the accompanying drawings, in which:

Fig. 1 is a diagrammatic view illustrating the various electrical connection and apparatus involved in the novel system; and Fig. 2 is a plan view of a control panel for use therein.

Referring to the drawings, more particularly Fig. 1 thereof, suitable transmitting and receiving apparatus for use both at a movable and fixed station is indicated, 10 designating a rotatable loop for a transmitted signal of high attenuation constant; and is preferably of the non-directional type consisting of two loops arranged in series and located at right angles to each other, said loop being adapted for connection to the coupling coil 11 by means of a double-throw double-pole switch 12.

It is to be understood, however, that under certain conditions where space or height is not a limiting factor, such as at a lighthouse or landing field, an open antenna 13 may be more efficiently employed, and the same is arranged to be connected through the aforesaid switch to the coupling coil 11 and grounded also as at 14.

A second coupling coil 15 with independent antenna 16 is provided for electromagnetic waves of relatively low attenuation constant, while an additional radiating system for an extremely short wave is indicated by the additional antenna 17, both of said antennæ being grounded at 14.

In the practical application of the invention, two wave lengths are chosen for comparison which have widely different radiating characteristics. I have found an ultra-long wave band, between 30,000 and 50,000 meters, to be suitable for one of the signals of high attenuation, and a short wave band, from 5 meters to 800 meters, to be suitable for the signal of low attenuation, the former being transmitted on high power and the latter on low power.

It would seem that the farther apart on the frequency spectrum the two frequencies lie, the better suited they would be for the system. In practice, however, the shorter wave lengths are found to exhibit certain phenomena such as skip-distance, absorption, etc., and therefore 800 meters is chosen as a reliable wave length of low attenuation at medium distances and 30,000 meters as a reliable wave length of high attenuation. I do not wish to be understood as limiting myself to these frequencies, however, as long wave bands may be utilized for both signals provided there are sufficient attenuation differences.

Curiously enough, another wave length which may be used in place of the ultra-long is the ultra-short wave length band of 2 meters and below; and this is interchanged with the ultra-long wave length, for comparison with the standard to determine the presence of an intervening object, as will hereinafter be set forth.

The ultra-short wave length band of 2 meters and below is apparently inherently one of limited range, and it is not necessary to resort to artificial means such as deformed antennæ, to produce the limited range characteristics. It is necessary to provide artificial means for radiating a signal of high attenuation, with the long wave, however. Theoretically, the long wave chosen, namely 30,00 meters, should not have inherently a limited range of transmission, since wave lengths approaching it, such as those of 20,000 meters, have shown good transmission over great distances when radiated from a suitable antenna system, such as one whose fundamental approximates that required for optimum radiation.

I have found, however, that where a deformed antenna, such as one having irregularly distributed capacity, in combination with an antenna of sub-natural period which is only a small fraction (such as one-one hundredth) of the optimum natural period required for unlimited range transmission, is employed, the system exhibits marked range limitation and high attenuation characteristics. For this reason it is of advantage to choose the longest possible wave length consistent with practical power limitation.

Waves longer than 50,000 meters require such enormous power for practical application with deformed antennæ as to be prohibitive. One calculation shows the power ratio between 30,000 meters, using a deformed antenna, and 800 meters, using an antenna of optimum radiating characteristics, as being approximately 1000 to 1 for the reception at one mile. For practical purposes, one watt may be used for energizing the short and ultra-short wave transmission circuit and one kilowatt for energizing the long wave transmission circuit, the radiations depending largely on the various antenna sizes and are determined by trial over a given distance such as a mile.

Waves shorter than the 30,000 meter band not only encroach upon commercial wave lengths, but have less contrast between their radiating characteristics and the radiating characteristics of the standard wave lengths with which they are compared.

Another type of deformed or sub-normal antenna for use in producing high attenuation signals may be obtained by using a large single or multi-turn and horizontally or vertically disposed transmitting loop excited with current at the desired frequency. Such a loop creates a strong field in its immediate vicinity which weakens rapidly with distance, unless the diameter of the loop approximates a quarter wave length. As it is impossible for practical reasons to make tests with vertical loops of such gigantic proportions as would be required for optimum radiation of 30,000 meters, the results can only be calculated. The attenuation of horizontally disposed loops, such as would be used to surround an aeroplane landing field, as well as vertical loops of practical size, however, is easily measured, and compared. The attenuation of signals from a horizontally disposed loop may be varied by tilting.

Still another type of suitable deformed antenna comprises a flat-top antenna with the junction of the vertical portion much higher from the earth than the free end of the horizontal, and only a small fraction of its length, such as an inverted L with the flat portion very near the ground at the free end. Such an antenna is a poor radiator, in the direction toward which the free end points, yet creates a strong field in its immediate vicinity.

Other well-known examples of deformed antenna suitable for producing high attenuation, are those formed by running the antenna conductors parallel and close to steel buildings, the sides of mountains, stacks of ships, steel bridges, etc. The so-called "absorption effects" of this construction creates what is known as "dead areas" or "blind spots" within certain zones, and these zones can be purposely created for the comparison of such attenuated signals with one which is not attenuated, and the difference translated into distance. Both ultra-long and ultra-short waves are affected by transmission from these deformed antennæ, although in different manner and degree. In cases of unsymmetrical antennæ, special calibration of the receiving instruments is necessary.

The energization of the various radiating means is accomplished through a suitable output circuit from a short-wave oscillator, as the tube 20 for the low attenuation wave transmission, from a suitable oscillator as the tube 21 for the high attenuation wave transmission, and by an oscillator as the tube 22 for the ultra-short wave transmission.

The primary energization for the various transmitting circuits hereinbefore noted may be obtained from a high frequency alternator 30, say of 10,000 cycles, supplying the plate current to the various oscillating tubes 20, 21 and 22 through the step-up transformer 31. This maintains the power ratio for all transmitter tubes at a constant value. In the primary of this transformer is connected a machine sender 32 operated from a driving motor 33 and adapted to continuously send the characteristic letter or other signal of the particular station. A well-known type of "chopper" 34 driven by a motor 35 simultaneously modulates the various transmitted wave energies as by interrupting the supply circuit, say approximately 500 times per second. Moreover, a switch 36 is included in the chopper circuit to allow the same to be short-circuited; and, similarly, a short-circuiting switch 37 is arranged in the sender circuit in order to enable, if desired, modulation by microphone currents for utilizing the system temporarily for limited range telephony.

For receiving purposes, three loops 40, 41 and 42, respectively for the long wave, short wave and ultra-short wave receiving circuits, are provided, the same being arranged in the same axis as on a shaft indicated by the line 43, Fig. 1, so as to all partake simultaneously of the same angular movement when the shaft is turned for the purpose hereinafter set forth. It is to be understood that where space is not a limiting factor, an open circuit antenna may be used for any two of the receiving circuits, provided always that one loop is maintained for the purpose of direction finding.

The receiving circuits for the long wave and short wave loops include the radio frequency tubes 44 and 45, respectively, as well as detector tubes 46 and 47, and similarly in the case of the ultra-short wave circuit, a radio frequency tube 48 and a detector tube 49 are provided. Each of the receiving circuits for the long and short waves, furthermore, is provided with an audio-frequency amplifying tube 50 and 51, respectively, while a double-throw double-pole switch 52 is introduced into the receiving circuit of the ultra-short wave loop 42 whereby this circuit can be connected also to the amplifying tube 50 at the same time cutting out reception from the loop 40. A double-throw double-pole switch 52', moreover, serves to connect the ultra-short wave loop 42 to the amplifying tube 51 and to cut out at the same time reception from the loop 41.

The output circuits 53 and 54 from the respective audio-frequency amplifiers 50 and 51 are connected through respective transformers 55 and 56 and rectifiers 57 and 58 to solenoids 59 and 60, the rectifiers serving to convert the pulsating audio-frequency currents to a direct current for the operation of said solenoids. These latter surround opposite ends of a movable core or armature 61 and are wound to exert opposing forces thereon, the core in turn being connected to an indicating arm or pointer 62 pivotally mounted for movement over a scale 63. I do not wish, however, to be restricted to the solenoid type of instrument for balancing as the dynamometer type may in some cases be found superior.

It is to be understood that all of the various tubes for the receiving circuits are to have substantially the same operating characteristics; and that both the receiving and transmitting circuits may embody the usual and well-known apparatus and connections, and that the currents of the output circuits 53—54 may be variously applied or amplified.

There is, furthermore, shunted across the respective output circuits 53 and 54 a variable resistance element 65 and a variable resistance element 66, whereby the strength of the output currents may be adjusted to balance the effect of the aforesaid solenoids upon the movable core 61 to cause the pointer 62 thereof to assume a zero position. This may further be checked by means of a set of head phones 67 inductively connected to the two output circuits through a transformer 68 and upon which coils 69 and 70 of the respective output circuits are wound in a direction to have their electromagnetic effects oppose each other. By this expedient, both a visible and an audible indication is had; and in accordance with the operation of the system as hereinafter more fully set forth, the resistances 65 and 66 are to be adjusted until the respective output currents balance each other.

The plate voltage for the plates of the thermionic tubes 50 and 51 of the aforesaid output circuits is obtained, also, from the high frequency generator 30, through the respective transformers 71 and 72, as is also the plate voltage for the transmitting circuits as hereinbefore noted, thus enabling duplex working of the system.

A stop-watch 75 is, furthermore, associated with the apparatus for manual or automatic operation, in the former case being provided with the operating button 76; and is utilized for timing the course of a moving transmitting station as hereinafter more fully described.

The various instruments may conveniently be mounted upon a panel, as indicated in Fig. 2, upon which the aforesaid stop-watch 75 is indicated at the top having alongside of it an ordinary standard clock 77 and at the opposite side a direction indicator 78 with which the shaft 43 of the various receiving loops is connected. The indicating apparatus embodying the pointer 62 may be mounted beneath the stop-watch 75; and upon either side thereof are mounted the respective resistors or adjustable shunt boxes 65 and 66.

The tuning condensers 40', 41' and 42' for the respective loops 40, 41 and 42 may also be mounted on said panel below the resistors and are operated by the respective knobs 79, 80 and 81. The double-throw switches 52 and 52' may be located along the bottom of the panel as well as a jack 82 for connecting in the telephone head set 67. Furthermore, a data chart 83 may also be provided on the panel, as indiated, and whereby the distance corresponding to the different steps on the resistors may be more conveniently and more accurately read.

From the foregoing, it will be understood that one of the solenoids is connected across and receives its power under control of the long-wave circuit while the other receives its power under control of the short-wave circuit, provision being made also to temporarily cut in the ultra-short-wave circuit through operation of the double-throw double-pole switch 52, it being understood that the long-wave signal thus received is of high attenuation constant while the low wave radio signal received is of low attenuation constant. The resistor for the former rarely, therefore, need be adjusted, the balancing adjustment being effected substantially only by the resistor of the low attenuation signal receiving circuit until the indicator 62 attains a zero or neutral position and no sound is heard in the head phones 67. The pointer 62 is maintained in neutral position when no external force is applied thereto by means of a spring 84, or in any other suitable manner, to be deflected in one direction or the other in accordance with the preponderance of energy of the one solenoid over the other. Direct readings from a measuring instrument of a signal of high attenuation are alone not feasible, as I have found that such readings are subject to deviations, and that it is necessary for even ordinary accuracy to provide some means of comparison for checking results.

In operation, a characteristic warning signal of pre-arranged timing is continuously transmitted simultaneously on two wave lengths, namely, the wave of high attenuation and the wave of low attenuation. This is accomplished by simultaneously modulating the two continuously transmitted waves corresponding to the high and low attenuation. Each of the signals produced by the two waves is separately received on the separate directional loops, located on a ship for example when used in conjunction with the transmission from a lighthouse, and each of the stations, of course, is provided with its own tuning devices, detectors, and amplifiers. The resultant signal from each loop is then transferred to the indicating instrument and balanced as hereinbefore set forth.

When very faint signals are being received, only the telephone method is used; and the same may be suitably relayed, if desired. When first picked up by the directive receiver loop, the signal of high attenuation may not be audible, indicating that the receiver at that moment is beyond the normal range of the transmitter. For stronger signals either the indicating instrument or telephone, or both, may be used and the one serving as a check on the other.

In ordinary distance finding, only two sets of wave lengths are needed; but in the case of very exact locations, such as the mooring mast of a dirigible air ship, the third wave length is used, as will hereinafter be more fully set forth.

Upon the reception of the characteristic signal from a warning station, each signal is first tuned to maximum reception, and the shunt across the weaker signal, usually the high attenuation signal, being placed at infinity. The adjustable resistor or shunt box across the low attenuation output circuit is then adjusted until the signals are equal. This point is indicated by the disappearance of all signals since the output circuits to the transformers with which they are connected, are in opposition, and may be called for convenience the "point of artificial balance".

The said adjustable resistors have previously been calibrated in miles; and by noting the value of the shunt at maximum signal reception and at zero signal reception, or balance, the distance in miles is at once apparent by taking a reading from the resistor.

The method of calibrating a shunt box scale is as follows:

If the apparatus is to be used over water, a portable receiver is installed on a small boat, and a transmitting station located on shore, with its transmitter sending out signals of pre-arranged power. Starting at the shortest distance from which it is desired to receive signals, a balance is taken between the high and low attenuation signals transmitted, and the position of the contact maker with attached pointer on the studs of the shunt box is noted, and referred to as the "artificial balance". At every quarter-mile, thereafter, or at every point from which it is desired that the apparatus shall determine distance, a reading is taken, the boat being moved from one position to the next in a direct line from the transmitter, and every division or stud of the resistor marked with the corresponding distance in miles at which a balance was found. At a given distance it will be found that the two signals balance each other naturally at infinity or open circuit, on the scale of both resistors or shunt boxes. In other words, at a given distance from the transmitter, both signals will be found to be of exactly the same intensity. This point is called for convenience the point of "natural balance".

Any distance within this point may be instantly noted by the fact that the high attenuation signal will be the stronger of the two signals, while any distance beyond this point may be instantly noted by the fact that the low attenuation signal will be the stronger of the two signals. Therefore, in choosing which shunt box is to be used to make measurements with, an operator is guided by the relative intensity of the two signals, always using the shunt box which corresponds to the stronger signal.

Instead of varying the receiver signals by means of the shunt box, the transmitter signals may be varied in relative intensity from time to time, and when they are of equal intensity at the receiver a prearranged calibrated scale at the transmitter may record the distance. Such an arrangement necessitates the communication of intelligence from receiver back to transmitter, however, unless the transmitted signals are coded according to their relative transmitting power.

Alternatively, the received signal from the transmitter of high attenuation of the distant station may be compared with a locally developed signal such as that received from the local transmitter of the same wave length of high attenuation; and under such conditions the short wave or signal of low attenuation is not necessary and may be dispensed with.

In some instances, as, for example when the apparatus is used at the mooring mast of a dirigible and the ship is at very close range, it may happen that the signal of high attenuation constant is the stronger signal, and the adjustable pointer on the shunt of the signal of low attenuation is then placed at infinity and the shunt of the signal of high attenuation is adjusted until a balance is reached. As the scales of both signals are calibrated, it is a simple matter to read the scale that is being adjusted, which should always be the one corresponding to the stronger signal.

The use of a third wave length as a check on the other two is made in the following manner:

The choice of an ultra-long wave for the signal of high attenuation is due, as hereinbefore noted, to the fact that such waves are well outside the wave bands of ordinary communication, the longest of which is under 25,000 meters, and to the fact that such waves can be depended upon to produce signals within a limited range when radiated from a sub-normal or deformed antenna.

Another limited range wave band may be found at the other end of the spectrum, namely the ultra-short band, of two meters and below. It so happens that each one of these wave bands, at the extreme ends of the radio spectrum, possess certain characteristics which are valuable for comparison and may be taken advantage of for determining distance at close range with great accuracy. For example, either one or the other may be used in combination with an intermediate wave length of low attenuation, such as 800 meters, and the difference in characteristic reception of each noted and made use of.

Thus, it is known that ultra-long waves are not easily absorbed by interfering conducting obstacles. I have found that a gigantic steel bridge within a few feet and directly in the line of transmission of a transmitter of ultra-long waves, made no appreciable difference in received signal strength, while an ultra-short wave is blocked completely by such obstruction, although each may have the same range limitation over water. I take advantage of these characteristics by introducing into the system means for determining whether or not there is an intervening obstacle between the transmitter and receiver. This feature is of great value in foggy or stormy weather in congested districts such as harbors, with many ships at close quarters, or in large cities having landing space or mooring masts on high buildings with other high buildings nearby.

In determining whether or not there is an intervening obstacle between the transmitter and receiver, the procedure is as follows:

A reading is first taken as hereinbefore set forth for computation with two waves. The third wave of ultra-short length, say of 2 meters, is radiated simultaneously with the other two, so that all three waves are simultaneously modulated. The third receiver, complete with its own loop, amplifier and detector and adapted for audio-frequency amplification and connection to the indicator, is then switched in at the receiving station by means of the throw-over switch 52 to connect first the ultra-long and then the ultra-short signal which is to be compared with the third signal of 800 meters (now the intermediate).

If the balance between the intermediate and the long wave, and between the intermediate and the short wave, remains the same, then no obstacle intervenes. If, however, there is a marked diminution in signal strength of the ultra-short wave, whereby the balance is destroyed, then by this destruction of balance the presence of an intervening obstacle is indicated.

Moreover, if the balance varies, from moment to moment, the indications are that the intervening object is in motion. If desired, a third reading is possible between the ultra-long and ultra-short waves for further comparison by means of the throw-over switches 52 and 52'.

In determining relative motion between transmitter and receiver, the transmitter may be similar to the one just described, and may be operated in the same way. The receiver also is the same, but the readings of the visual indicating instruments are different. In this instance, the readings of the indicating instrument are first balanced against each other through the medium of its pointer which is caused to register zero. If, now, the action be continued and either the transmitter or the receiver moves to increase or decrease the distance between them, the balance is at once destroyed; and knowing always the condition at the receiver, a simple deduction of course determines the condition of the transmitter as to motion or speed.

To determine whether the transmitter is approaching or receding, a note is made of the following readings. Assuming for the purpose of illustration that a pointer movement to one side of the zero position registers the readings of the long wave and to the opposite side thereof the short wave, a rise in current in the long wave meter solenoid only, causing movement of the pointer accordingly, indicates that the distance between stations is decreasing because the long wave signals of 30,000 meters, or signals of high attenuation, are increasing in strength; while the short wave signals of 800 meters, or signals of low attenuation, are changing little, if at all.

On the other hand, if the short wave meter solenoid only shows a rise in current, with consequent pointer movement, it is an indication that the distance between stations is increasing because the long wave signals, or signals of high attenuation, are decreasing in strength; while the short wave signals, or signals of low attenuation, are changing little, if at all.

The relative unbalancing of the circuits by the approach or recession of the moving transmitter will always become apparent in this manner. Instead of indicating instruments, aural indication by head telephones may also be used as previously described for distance measurement, one phone being connected to the long wave signal and one to the short wave signal. The appearance of a signal in either phone, after balancing to zero, will serve as an indication as to whether the transmitter is approaching or receding in substantially the same manner as with a visual indication. This method requires more skill to operate than the visual method, however. The reverse operation, that of determining approach or recession of the receiver is carried out in substantially the same manner, merely substituting the moving receiver for the object the direction of progress of which it is desired to determine.

The rate at which a moving station is approaching or receding may be determined by the use of the balancing apparatus as previously described, using the same transmitters and receivers. In addition to the visual indicator, the stop-watch 75 is provided, being preferably located on a panel as shown in Fig. 2. At the moment when a balance is reached between the two solenoids, causing the needle to read zero, the stop watch is started. Assuming that the transmitter, which, for example may be a dirigible approaching the mooring mast in a fog, is in motion, then immediately there will be an unbalancing of the meter needle and the solenoid operated by the signal of high attenuation or the long wave will register an increased reading over its range, showing that the dirigible is approaching.

To determine how many miles the dirigible has progressed since the stop-watch was started, the balancing operation is repeated by again bringing the needle to zero. When a definite number of miles has been registered by the instrument, as shown by this second balancing, the stop-watch is stopped, preferably at a pre-arranged elapsed time in round number, such as 30 seconds, for example; and by a simple calculation of dividing the number of miles between the first and second balancing operations by the time required to cover the distance, the rate of progress may be found.

The control of the stop-watch may conveniently be effected manually by the button 76, or automatically; and to facilitate quick reading of the rate of progress of the moving transmitter station, the resistors may be provided with slidable scales (not shown) and adjustable to a zero position on the resistor arm in beginning an adjustment of the resistor. This makes it unnecessary to remember or make note of the previous reading, only the last reading being necessary to determine the mileage covered.

To compensate for the difference in signal strength at various distances, there is provided the correction factor chart 83, which has previously been made up from calibrations at various distances. For example a reading taken at five miles and another at two miles, the latter being for the stronger signal, would show a progression of the transmitter of three miles, in a given time. The amount of shunt resistance required to balance the signals at five miles would not, however, be the same as at three miles, although the signal strength should be the same for the same distance at any time. Accordingly, test readings are previously taken at every half or quarter mile, as hereinbefore noted, and the amount of shunt necessary to produce a balance noted. From these readings a correction factor may be devised for every quarter mile reading or multiple of it.

For example, having a definite number of studs on the shunt box and each stud being numbered, a list of readings corresponding to every combination of studs used in conjunction with it to obtain a balance, may be provided, and quickly read off when the balance is obtained. Then, assuming there are twenty-five studs on the shunt box and that each stud representing one quarter mile, for a second reading of say 5 to obtain a balance, there would be 24 possible distances at which this reading might be made. It might be made at ¼ mile, ½ mile, 1 mile, or any distance up to 5 miles. Obviously, greater distances are attainable by increasing the power of the transmitters. The chart, therefore, is provided to enable the operator to determine with greater accuracy the rate of progress of the transmitter station, when the second balancing is taken at these various distances.

It is, of course, preferable to take all rates of progress from the same distance, and over the same distances, when possible.

The same method is of course equally applicable to any moving object equipped with the hereinbefore described transmitting apparatus, such as an automobile, locomotive, ship, airplane, etc. The reverse operation, that is, the determination of the rate of progress of the receiver station, when the transmitter station is fixed, is carried out in substantially the same way, merely substituting the moving receiver station for the object whose rate of progress it is desired to determine.

In order to allow an operator to hear warning signals from another transmitter, while his own transmitter is in operation, it is preferred to employ a duplex system which alternately renders transmitter and receiver inoperative at a rate of speed which is inaudible. This is accomplished, as hereinbefore noted, by supplying the plate circuits of both transmitter tubes and receiver tubes with energy from the same dynamo or high frequency alternator 30, which may have a frequency of 10,000 cycles.

By reversing the polarity of the primary windings of the step-up transformers through which each tube is supplied with plate voltage from this alternator, the transmitting tubes may be made to operate on positive half waves and the receiving tubes on negative half waves of the alternator. As these two waves never occur at the same time, and as only positive half waves will operate the tubes, it will be seen that transmitting and receiving apparatus will not interfere with each other.

Moreover, the rate of shifting from one to the other being above audibility, the operator is allowed a zone of silence through which he can hear the distant transmitter. Furthermore, such plate current should, preferably, not be filtered, as this would prolong the plate supply to an extent sufficient for both transmitting and receiving tubes to be partially active at the same time. However, this may of course be avoided by supplying both transmitter and receiver plate circuits with direct current in the usual way and biasing alternately the grids of the tubes sufficiently to render them inoperative by means of the high frequency alternator.

When a high frequency alternator is used as the energizing source for the long wave transmitting loop, the duplex system is unsuited, but a break-in key or like device may serve substantially the same purpose. I am aware that the broad idea of shifting from transmitter to receiver at an inaudible rate is not new and I do not claim broadly such a system.

The distance measuring apparatus hereinbefore described together with the associated circuits for determining progress and direction of progress of a moving transmitter station, it will be understood, may all be located in a suitable cabinet or box (not shown) and of convenient size for installation on board ship, aircraft and the like, and may be made into a light and compact unit notwithstanding the many parts included in the apparatus. The receiving loops may be extensible. Likewise, the transmitting apparatus may be installed in a convenient cabinet or on a panel similar to a standard radio panel and supplied with power in the same way.

While I have described the apparatus as relating to a specific system, many of the devices employed therefor may be used in other ways and in other systems, without departing from the scope of the appended claims.

I claim:

1. The method of determining, by radiant energy, the distance between a transmitter and a receiver unit thereof, which consists in transmitting from a common source a plurality of supersonic electromagnetic waves of different attenuation constants, simultaneously modulating said waves, receiving the modulated waves, and visually ascertaining the difference between their relative electrical effects as a measure of the distance sought by simultaneously and differentially comparing said effects.

2. The method of determining, by radiant energy, the distance between a transmitter and receiver unit thereof, and of ascertaining the presence or absence of an intervening object, which consists in first determining the distance between the units by transmitting a plurality of electromagnetic waves of different attenuation constants, visually ascertaining the difference between their relative electrical effects as the measure of the distance sought, repeating the transmission and reception operations with waves of different absorption properties, and ascertaining thereby the difference, if any, in the resulting distance determination.

3. In a system embodying a moving unit and a stationary unit: the method of determining, by radiant energy, the distance between the units and the speed of the moving unit which consists in effecting a visual substantially instantaneous determination by transmitting from one of the units a plurality of electromagnetic waves of different attenuation constants, receiving the modulated waves on the other unit, visually ascertaining the difference of their relative electrical effects as a measure of the distance between the units by simultaneously and differentially comparing said effects, repeating the distance determination visually and substantially instantaneously, and ascertaining the time interval between the two determinations as a measure of the speed of the moving unit.

4. In a system embodying a moving unit and a stationary unit: the method of determining, by radiant energy, the distance between the units and the approach or recession of the moving unit, which consists in effecting a visual substantially instantaneous determination by transmitting from one of the units a plurality of electromagnetic waves of different attenuation constants, receiving at the other unit the modulated waves, visually ascertaining the difference of their relative electrical effects as a measure of the distance between the units by simultaneously and differentially comparing said effects, and continuing the determination visually and substantially instantaneously over a period sufficient to ascertain any change in distance as a measure of the approach or recession of the moving unit.

5. In a system of the character set forth: a plurality of transmitting antennæ adapted for a relatively long electromagnetic wave, a relatively short electromagnetic wave and an ultra-short electromagnetic wave; means to simultaneously modulate the waves transmitted by said antennæ; a plurality of receiving antennæ and circuits with characteristics corresponding to the transmitted waves; visual instrumentalities subject to the effects of a plurality of the received waves; means to individually adjust the said effects thereon whereby the difference therebetween is physically indicated; and means to subject the said instrumentalities to the effects of either the long or ultra-short electromagnetic wave and the short electromagnetic wave for the purpose of determining the presence of an obstacle between the transmitting and receiving antennæ.

6. In a system of the character set forth: a plurality of transmitting antennæ adapted for a relatively long electromagnetic wave, a relatively short electromagnetic wave and an ultra-short electromagnetic wave; means to simultaneously modulate the waves transmitted by said antennæ; a plurality of receiving antennæ and circuits with characteristics corresponding to the transmitted waves; visual instrumentalities subject to the effects of a plurality of the received waves; and means to subject the instrumentalities to the effects of either the short or ultra-short electromagneic wave and the long electromagnetic wave for the purpose of determining the presence of an obstacle between the transmitting and receiving antennæ.

7. In a system of the character set forth: a plurality of transmitting antennæ adapted for electromagnetic waves of supersonic frequency and of different attenuation constants; means to simultaneously modulate the waves transmitted by said antennæ; a plurality of receiving antennæ and circuits with characteristics corresponding to the transmitted waves; visual instrumentalities subject to the effects of a plurality of received waves, one of the effects serving then as a point of reference and the other as a measuring value; means to individually adjust the said effects thereon whereby to determine the distance of the receiving antennæ from the transmitting antennæ; and means for determining simultaneously with the reception of the waves by the receiving antennæ the direction of the transmitting antennæ.

8. In a system of the character set forth: a plurality of transmitting antennæ, means to transmit therefrom a plurality of electromagnetic waves of different attenuation constants; means to simultaneously modulate the waves transmitted by said antennæ; a plurality of receiving antennæ and circuits with characteristics corresponding to the transmitted waves; visual instrumentalities subject to the effects of a plurality of the received waves, means actuated by the energy received by one of the receiving antennæ serving then as a point of reference and means actuated by the energy received by another of the receiving antennæ serving as a measuring value; and means to individually adjust the said effects thereon whereby the difference therebetween is physically indicated.

9. In a system of the character set forth: a plurality of transmitting antennæ, means to transmit therefrom respectively a relatively long electromagnetic wave of supersonic frequency and a relatively short electromagnetic wave of supersonic frequency; means to simultaneously modulate waves transmitted by said antennæ; a plurality of receiving antennæ and circuits with characteristics corresponding to the transmitted waves; visual instrumentalities subject to the effects of a plurality of the received waves, means actuated by the energy received by one of the receiving antennæ serving then as a point of reference and means actuated by the energy received by another of the receiving antennæ serving as a measuring value; and means to individually adjust the said effects thereon whereby the difference therebetween is physically indicated.

10. In a system of the character set forth: a plurality of transmitting antennæ, means to transmit therefrom respectively a relatively long electromagnetic wave of supersonic frequency, a relatively short electromagnetic wave of supersonic frequency and an ultra-short electromagnetic wave of supersonic frequency; means to simultaneously modulate the waves transmitted by said antennæ; a plurality of receiving antennæ and circuits with characteristics corresponding to the transmitted waves; visual instrumentalities subject to the effects of a plurality of the received waves, means actuated by the energy received by one of the receiving antennæ serving then as a point of reference and means actuated by the energy received by another of the receiving antennæ serving as a measuring value; and means to individually adjust the said effects thereon whereby the difference therebetween is physically indicated.

EDWARD G. GAGE.